United States Patent [19]

Watanabe et al.

[11] Patent Number: 5,142,388

[45] Date of Patent: Aug. 25, 1992

[54] COLOR DISPLAY DEVICE HAVING LIQUID CRYSTAL CELL AND FLUORESCENT DISPLAY WITH TWO DIFFERENT LUMINOUS SECTIONS

[75] Inventors: Hiroshi Watanabe; Youichi Ikuta, both of Mobara, Japan.

[73] Assignee: Futaba Denshi Kogyo K.K., Mobara, Japan

[21] Appl. No.: 811,871

[22] Filed: Dec. 20, 1991

Related U.S. Application Data

[63] Continuation of Ser. No. 269,722, Nov. 10, 1988, abandoned.

[30] Foreign Application Priority Data

Nov. 10, 1987 [JP] Japan ............................ 62-282066
Nov. 11, 1987 [JP] Japan ............................ 62-284573

[51] Int. Cl.$^5$ ................... G02F 1/133; H05B 33/00; G09F 9/46
[52] U.S. Cl. ......................... 359/50; 359/53; 359/64; 340/781; 313/496; 315/169.3
[58] Field of Search .............. 350/345, 347 E, 335, 350/337, 350 F; 340/784, 781, 760; 313/496, 497; 315/169.1, 169.3

[56] References Cited

U.S. PATENT DOCUMENTS

| | | | |
|---|---|---|---|
| 4,170,771 | 10/1979 | Bly ............................. | 340/781 |
| 4,170,772 | 10/1979 | Bly ............................. | 340/781 |
| 4,218,636 | 8/1980 | Miyazawa et al. ................ | 315/169.1 |
| 4,303,913 | 12/1981 | Tohda et al. .................... | 340/774 |
| 4,416,514 | 11/1983 | Plummer ......................... | 350/335 |
| 4,525,653 | 6/1985 | Smith ............................ | 315/366 |
| 4,542,322 | 9/1985 | Irie et al. ...................... | 315/360 |
| 4,580,877 | 4/1986 | Washo ............................ | 350/345 |
| 4,595,862 | 6/1986 | Morimoto et al. ................. | 315/169.1 |
| 4,611,889 | 9/1986 | Buzak ............................ | 350/345 |
| 4,670,744 | 6/1987 | Buzak ............................ | 350/335 |
| 4,693,560 | 9/1987 | Wiley ............................ | 350/335 |
| 4,715,687 | 12/1987 | Glass et al. ..................... | 350/333 |
| 4,758,818 | 5/1988 | Vatne ............................ | 350/335 |
| 4,772,885 | 9/1988 | Uehara et al. .................... | 350/345 |
| 4,799,050 | 1/1989 | Prince et al. .................... | 350/345 |
| 4,825,230 | 4/1989 | Shimizu .......................... | 315/169.3 |
| 4,856,877 | 8/1989 | Nishimori et al. ................. | 350/345 |
| 4,867,536 | 9/1989 | Pidsony et al. ................... | 350/335 |
| 4,870,484 | 9/1989 | Sonehara ......................... | 350/339 F |
| 4,874,986 | 10/1989 | Menn et al. ..................... | 340/781 |
| 4,907,862 | 3/1990 | Suntolo .......................... | 350/339 F |
| 4,929,061 | 5/1990 | Tominaga et al. ................. | 350/339 F |
| 4,935,670 | 7/1990 | Watanabe ......................... | 315/169.1 |

FOREIGN PATENT DOCUMENTS 58-126515 10/1983 Japan.

OTHER PUBLICATIONS

Brinson et al—"LC Apparatus For Converting Black and White CRT Display Into Colored Display" IBM Technical Disclosure Bulletin—vol. 22—No. 5—Oct. 79—pp. 1769-1772.

T. Uchida—"Multicolored Liquid Crystal Displays" Optical Engineering—May-Jun. 1984—vol. 23, No. 3—pp. 247-252.

Primary Examiner—Stanley D. Miller
Assistant Examiner—Tai V. Duong
Attorney, Agent, or Firm—Oblon, Spivak, McClelland, Maier & Neustadt

[57] ABSTRACT

A color display device capable of emitting three primary colors of equalized luminance, so that color display of high quality which is free of unevenness may be accomplished. The color display device is so constructed that a fluorescent display section including first and second luminous sections different in luminous characteristics is combined with an optical rotation section and color polarizing plates. The fluorescent display section and optical rotation section are synchronously driven.

6 Claims, 6 Drawing Sheets

COLOR DISPLAY DEVICE HAVING LIQUID CRYSTAL CELL AND FLUORESCENT DISPLAY WITH TWO DIFFERENT LUMINOUS SECTIONS

This application is a continuation of application Ser. No. 07/269,722, filed on Nov. 10, 1988, now abandoned.

BACKGROUND OF THE INVENTION

1. Field of the Invention

This invention relates to a color display device for displaying a multicolor image such as letters, figures or the like, and more particularly to a field-sequential color display device constructed by means of a fluorescent display device and color polarizing plates.

2. Description of the Prior Art

There has been proposed a color display device constructed in such a manner as disclosed in Japanese patent application Laying-Open Publication No. 126515/1983. The proposed device is a field-sequential color display device comprising a combination of a fluorescent display device for displaying an image, and color polarizing plates and a liquid crystal shutter for selecting a wavelength of transmitted light.

The conventional color display device proposed is adapted to carry out display of an image according to a field-sequential system rather than a parallel color-mixture system, so that it may improve resolution of the display. However, in order to accomplish full color display of an image, a luminous display device for the conventional color display device is required to exhibit luminous capability over a wide wavelength range. Such requirements will be described hereinafter in connection with a case that a fluorescent display device is used as the luminous display device. In the fluorescent display device, a ZnO:Zn phosphor is used for this purpose because it has the widest wavelength range for luminescence and is excellent in properties such as a useful service life and the like. Although it has an emission spectrum over a substantially whole visible region, it is decreased in luminance in a red region, resulting in a failure in the full color display.

As an approach to such a problem is proposed a fluorescent display device which is constructed so as to arrange a phosphor of a red luminous color adjacent to the ZnO:Zn phosphor, as well as employs a combination of the field-sequential system and parallel color-mixture system. In the fluorescent display device, the ZnO:Zn phosphor is used to obtain display of blue and green luminous colors and the phosphor of a red luminous color is used to obtain display of the color red. Also, a liquid crystal shutter is driven in synchronism with driving of the fluorescent display device, so that color display is carried out in the order of a red display section, a green display section and a blue display section at every line or field. This results in the amount of display of a red luminous color being increased to lead to desired full color display.

A typical phosphor of a red luminous color is, for example, a $Y_2O_2S:Eu$ phosphor. Unfortunately, the phosphor has luminous efficiency as low as about 2% of that of the ZnO:Zn phosphor, so that luminance of red luminous display on a color display plane is reduced as compared with blue or green luminous display, resulting in nonuniformity occurring in color display.

In order to improve such nonuniformity, it would be considered to carry out operation for luminous display in the order of the red display section, green display section and blue display section and drive the red display section for a period longer than the blue and green display sections. However, this causes a time used for driving the green and blue display sections to be decreased because a frame cycle is kept constant, resulting in a decrease in overall luminance.

SUMMARY OF THE INVENTION

The present invention has been made in view of the foregoing disadvantage of the prior art.

Accordingly, it is an object of the present invention to provide a field-sequential color display device constituted by a fluorescent display device and color polarizing plates which is capable of significantly equalizing luminance and luminescence of luminous display sections.

In accordance with the present invention, a color display device provided. The color display device includes a fluorescent display section including a first luminous section for emitting light containing a light component of a first wavelength and a light component of a second wavelength and exhibiting luminance above a predetermined level in a specific wavelength range and a second luminous section for emitting light containing a light component of a third wavelength. Also, the device includes at least one optical rotation section for transmitting light emitted from the fluorescent display section, a neutral polarizing plate and a plurality of color polarizing plates arranged in a manner to interpose optical rotation section therebetween. Further, the device includes a display drive section for driving the fluorescent display section depending on a display signal and a control section for controlling optical rotation characteristics of the optical rotation section in synchronism with driving of the fluorescent display section by said display drive section.

In a preferred embodiment of the present invention, the fluorescent display section, the neutral polarizing plate, the optical rotation section, a first color polarizing plate for transmitting light of the first and third wavelengths and a second color polarizing plate for transmitting light of the second and third wavelengths are arranged in parallel in order.

In a preferred embodiment of the present invention, the fluorescent display section, a first color polarizing plate, a first optical rotation section, a second color polarizing plate, a second optical rotation section and the neutral polarizing plate are arranged in parallel in order.

In a preferred embodiment of the present invention, the first and second luminous sections of the fluorescent display section are formed of a $ZnO:Zn$ phosphor and a $Y_2O_2S:Eu$ phosphor, respectively.

Alternatively, the first and second luminous sections of the fluorescent display section may be formed of a $ZnO:Zn$ phosphor and a $(Zn,Cd)S:Ag,Cl$ phosphor, respectively.

Also, in a preferred embodiment of the present invention, the optical rotation section is formed of a liquid crystal cell.

Thus, in the color display device of the present invention constructed as described above, the fluorescent display section including the first and second luminous sections different in luminous characteristics is combined with the optical rotation section and color polarizing plates, and the fluorescent display section and optical rotation section are synchronously driven, so that three primary colors of equalized luminance may be emitted, resulting in color display of high quality which is free of unevenness being accomplished.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals like or corresponding parts; wherein.

DETAILED DESCRIPTION OF THE PREFERRED EMBODIMENTS

Now, a color display device according to the present invention will be described hereinafter with reference to the accompanying drawings.

Figure 1:
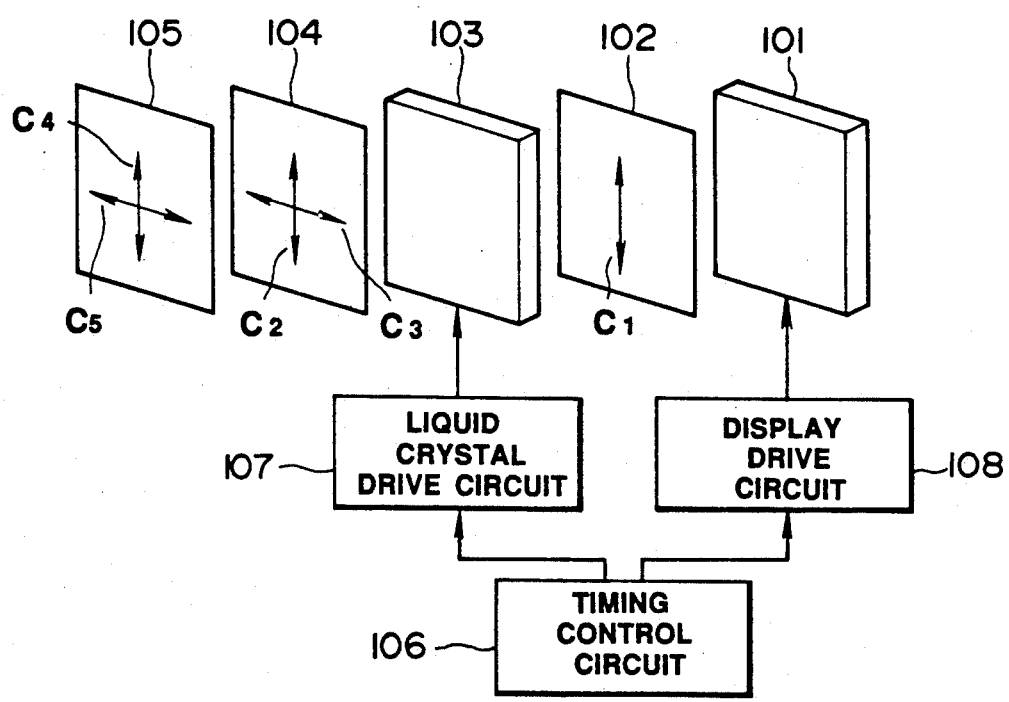
FIG. 1 is an exploded perspective view schematically showing a first embodiment of a color display device according to the present invention.

FIG. 1 is an exploded perspective view schematically showing a general structure of a first embodiment of a color display device according to the present invention.

A color display device of the first embodiment includes a fluorescent display section 101 serving as a luminous section which emits light of a band-like spectrum to display an image such as a letter, a figure or the like. The fluorescent display section 101 may be generally constructed in substantially the same manner as a fluorescent display tube which has been extensively used as a display element. A structure of the fluorescent display section will be detailedly described later.

Light emitted from the fluorescent display section 101 depending on its display pattern is polarized through a neutral polarizing plate 102 adapted to transmit light of a white color having a predetermined directional component, so that light deflected in a direction of a polarization axis $C_1$ is incident to a ferroelectric liquid crystal cell 103.

The ferroelectric liquid crystal cell 103 is formed by depositing transparent electrodes all over surfaces of two transparent substrate opposite to each other and sealing a smectic C-phase liquid crystal which is a ferroelectric liquid crystal between the transparent electrodes.

Light passed through the liquid crystal cell 103 is then passed through a first color polarizing plate 104 having a polarization axis $C_2$ transmitting white light and a polarization axis $C_3$ transmitting violet light and then discharged through a second color polarizing plate 105 having a polarization axis $C_5$ transmitting white light and a polarization axis $C_4$ transmitting light of the color yellow which is a mixture of the colors green and red, resulting in light of a desired luminous color being generated.

Figure 6:
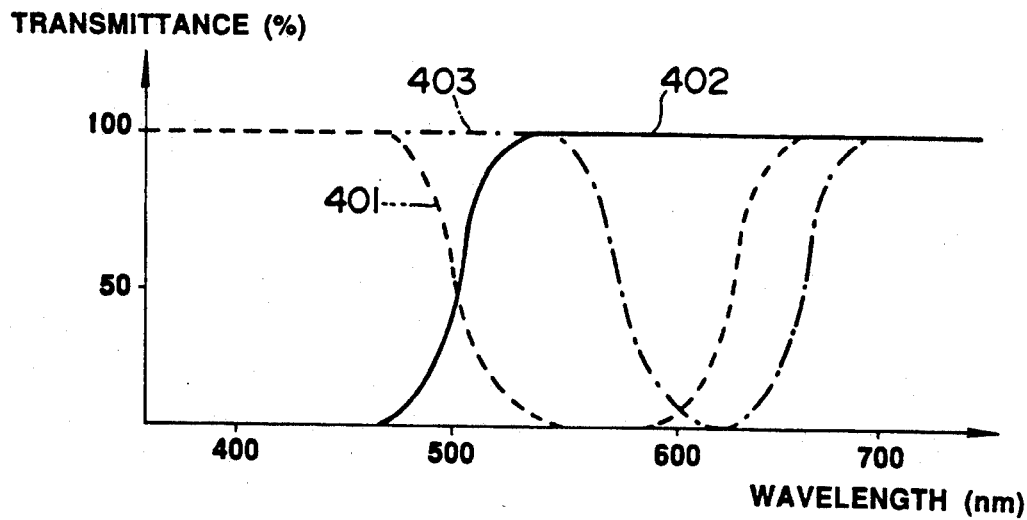
FIG. 6 is a graphical representation showing light transmission characteristics of a color polarizing plate used in the color display device shown in FIG. 1.

FIG. 6 shows light-transmission characteristics of each of the color polarizing plates, wherein 401 and 402 indicate such characteristics of the first and second color polarizing plates 104 and 105, respectively, and 403 indicates light-transmission characteristics of an auxiliary filter described below.

The fluorescent display section 101 is driven and controlled by a display drive circuit 108. The liquid crystal cell 103 is driven by a liquid crystal drive circuit 107, so that its optical activity may be controlled. Driving of the fluorescent display section 101 and that of liquid crystal cell 103 are synchronously controlled by a timing control circuit 106.

Figure 2A:
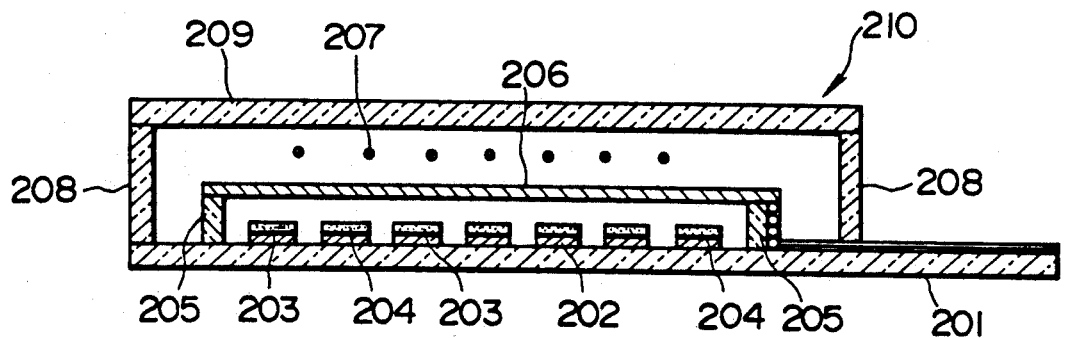
FIG. 2(a) is a schematic sectional view showing a fluorescent display section in the color display device shown in FIG. 1.
Figure 2B:
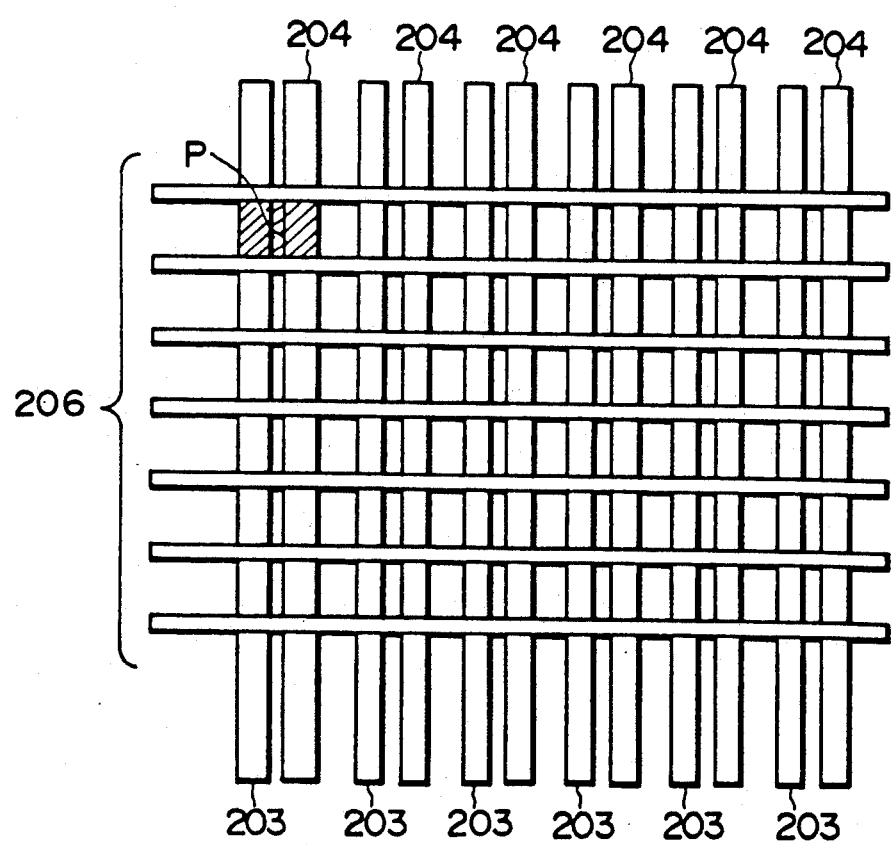
FIG. 2(b) is a schematic plan view showing arrangement of electrodes in the fluorescent display section shown in FIG. 2(a)

FIG. 2(a) shows a general structure of the fluorescent display section 101 in the color display device of the first embodiment and FIG. 2(b) is a fragmentary enlarged schematic view showing arrangement of electrodes in the fluorescent display section 101.

As shown in FIGS. 2(a) and 2(b), the fluorescent display section includes a substrate 201 made of glass or the like, on which a plurality of stripe-like anode conductors 202 are arranged in parallel to one another and at predetermined intervals in a predetermined direction. The anode conductors 202 each have a ZnO:Zn phosphor and a $Y_2O_2S$:Eu phosphor alternately deposited thereon. The ZnO:Zn phosphor serves as a first luminous section emitting light containing a light component of a first wavelength and a light component of a second wavelength, whereas the $Y_2O_2S$:Eu phosphor acts as a second luminous section emitting light containing a light component of a third wavelength. Each adjacent two phosphors 203 and 204 constitute each group.

Figure 5:
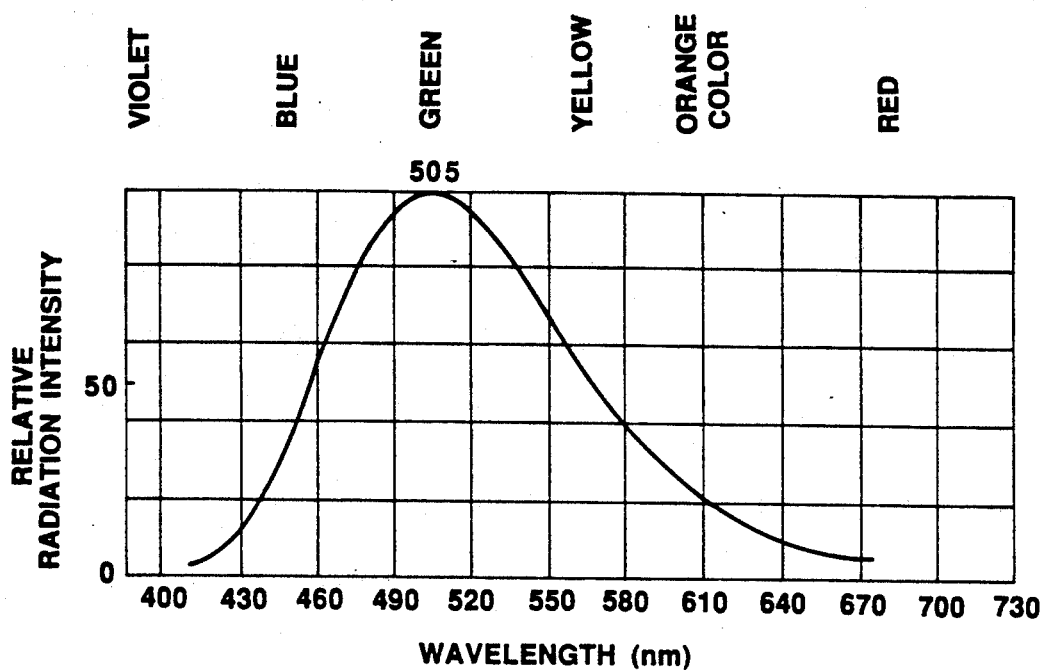
FIG. 5 is a graphical representation showing an emission spectrum of a ZnO:Zn phosphor used in the color display device shown in FIG. 1.

The ZnO:Zn phosphor 203 constituting the first luminous section, as shown in FIG. 5, emits light of a band-like spectrum exhibiting luminance of a predetermined level or more in a specific wavelength range containing the colors green and blue but is decreased in luminance of a red light component, whereas the $Y_2O_2S$:Eu phosphor 204 acting as the second luminous section emits red light of luminance above a predetermined level. In this instance, a (Zn,Cd)S:Ag,Cl phosphor may be substituted for the $Y_2O_2S$:Eu phosphor.

The fluorescent display section 101 also includes a plurality of wire-like control electrodes 206 supported on supports 205 and arranged above a plurality of sets of the ZnO:Zn and $Y_2O_2S$:Eu phosphors 203 and 204 so as to be spaced from one another at predetermined intervals and extend in a direction across the phosphors. The control electrodes 206 constitute matrix-like display planes in cooperation with each set of the phosphors 203 and 204. Above the control electrodes 206 are stretchedly arranged a plurality of filamentary cathodes 207 in a direction across the phosphors like the control electrodes 206. The filamentary cathodes 207 serve as an electron emitting source. The above-described electrodes for the fluorescent display section 101 are held in an envelope 210 constituted by the substrate 201, side plates 208 and a front cover 209 and evacuated to high vacuum. Terminals of the electrodes are led out from the envelope 210 and connected to the display drive circuit 108.

In the fluorescent display section 101 constructed as described above, selection of a picture cell takes place in a manner to supply a display signal to the anodes 202 in parallel and shift the wire-like control electrodes 206 while concurrently selecting two adjacent control electrodes 206. In the illustrated embodiment, one matrix-like area or region P formed by interposing one set of two anodes 202 having the ZnO:Zn phosphor 203 and $Y_2O_2S$:Eu phosphor 204 respectively deposited thereon between two adjacent control electrodes 206 constitutes one picture cell.

Figure 3:
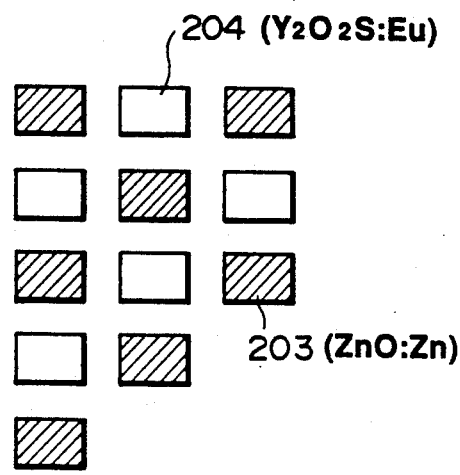
FIG. 3 is a plan view showing another luminous pattern in the fluorescent display section shown in FIG. 2(a)

In the fluorescent display section 101 shown in FIGS. 2(a) and 2(b), the luminous section is constituted by a plurality of the stripe-like anode conductors 202 arranged in parallel to one another. A configuration and a pattern of arrangement of each anode conductor 202 other than the above may be employed. For example, the section 101 may be so constructed that the anode conductors 202 may be formed into a dot-like shape and the anode conductors having the ZnO:Zn phosphor 203 and $Y_2O_2S$:Eu phosphor 204 respectively deposited thereon are arranged lengthwise and crosswise at predetermined intervals, as shown in FIG. 3. In this instance, it is required to keep a pitch or interval between each set of the picture cells like the above.

Now, the manner of operation of the first embodiment will be described hereinafter.

Figure 4:
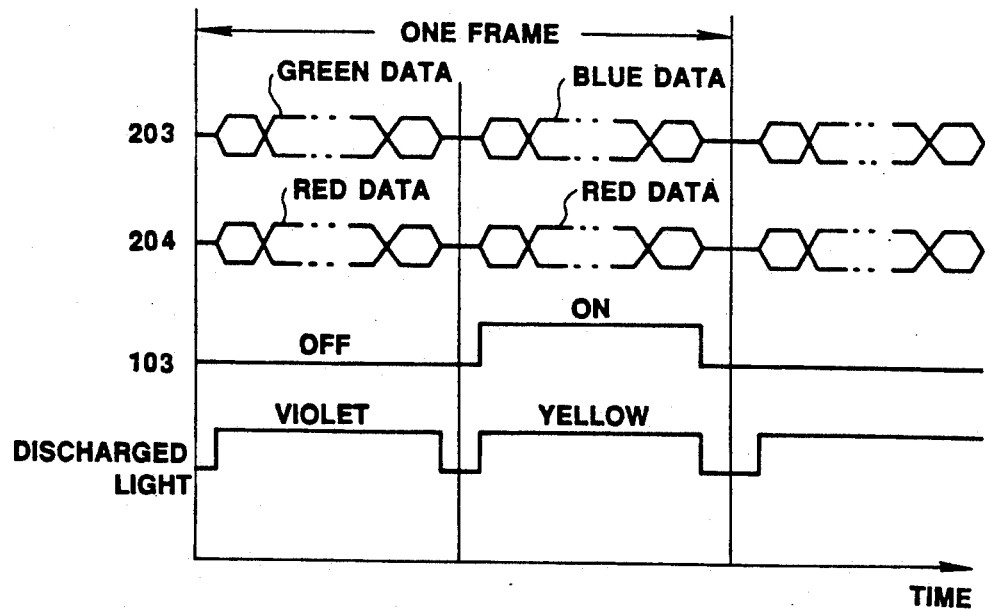
FIG. 4 is a timing chart showing a timing of drive of the color display device shown in FIG. 1.

FIG. 4 is a timing chart showing a timing of drive of the color display device of the first embodiment.

First, when it is desired to display a pattern of a green luminous color, the fluorescent display section 101 is subjected to time-sharing drive and controlled to carry out emission of the ZnO:Zn phosphor 203 in a desired pattern. Concurrently, the liquid crystal cell 103 is turned on to discharge therefrom incident light in a polarized state without any optical rotation. Light thus discharged from the fluorescent display section 101 is deflected in a direction of the polarization axis $C_1$ by the neutral polarizing plate 102 and then deflected along the polarization axes $C_2$ and $C_4$ of the first and second color polarizing plates 104 and 105. At this time, a red component contained in light emitted from the ZnO:Zn phosphor 203 is highly decreased, resulting in the discharged light substantially consisting of only a green light component.

Display of a blue pattern is carried out by emitting light from the ZnO:Zn phosphor 203 in a desired pattern and concurrently turning off the liquid crystal cell 103 to deflect light in a direction of the polarization axis $C_1$ of the neutral polarizing plate 102. The light is then subjected to optical rotation by 90° by means of the liquid crystal cell 103 and then discharged therefrom. Thereafter, the light is deflected along the polarization axes $C_3$ and $C_5$ of the first and second color polarizing plates 104 and 105 and then discharged therefrom. Also at this time, a red light component contained in light emitted from the ZnO:Zn phosphor 203 is decreased, so that the discharged light substantially consists of only a blue component.

Display of a red pattern is carried out by driving and controlling the fluorescent display section 101 in parallel to driving and controlling of the section 101 for display of the green and blue patterns. More particularly, the $Y_2O_2S$:Eu phosphor 204 in the fluorescent display section 101 is driven to emit light in a desired pattern, which is then deflected in a direction of the polarization axis $C_1$ by the neutral polarizing plate 102. Subsequently, it is passed through the liquid crystal cell 103 and then through the first and second color polarizing plates 104 and 105. At this time, when the liquid crystal cell 103 is at a state of being turned on, the light is discharged through the polarization axes $C_2$ and $C_4$ of the first and second color polarizing plates 104 and 105; whereas when it is kept turned off, the light is discharged through the polarization axes $C_3$ and $C_5$ of the first and second color polarizing plates 104 and 105. Thus, the discharged light consists of only a red light component irrespective of the turning-on or turning-off of the liquid crystal cell 103.

When it is desired to display a pattern of a mixed luminous color of red, green and blue, the ZnO:Zn phosphor 203 of the desired pattern corresponding to the colors green and blue is driven for emission temporally in series during every ½ frame period and the liquid crystal cell 103 is driven and controlled for turning-on or turning-off. Concurrently and in parallel with the driving and controlling, the $Y_2O_2S$:Eu phosphor 204 of a desired pattern corresponding to the color red is driven for emission. This permits the ZnO:Zn phosphor 203 for each of the green and blue patterns to be driven for a ½ frame period and the $Y_2O_2S$:Eu phosphor for the red pattern to be driven over a whole frame period. Thus, it will be noted that the illustrated embodiment, even when luminance of light of a red luminous color is low as compared with that of each of blue light and green light, improves luminance of the red light, so that an increase in luminance and full color display may be accomplished unlike driving in series in the order of the colors green, blue and red.

In the first embodiment described above, when spectral transmission characteristics of the color polarizing plates 104 and 105 are deteriorated, an auxiliary filter may be used which has such transmission characteristics as indicated at dashed lines 403 in FIG. 6. This results in color characteristics of the plates being improved without adversely affecting green light and blue light.

Thus, the first embodiment is constructed so as to cause a light component of a first wavelength and a light component of a second wavelength to be emitted temporally in series and a light component of a third wavelength to be emitted in parallel with the light components of a first and second wavelengths, so that luminance of light discharged may be significantly increased to accomplish full color display free of unevenness.

Figure 7:
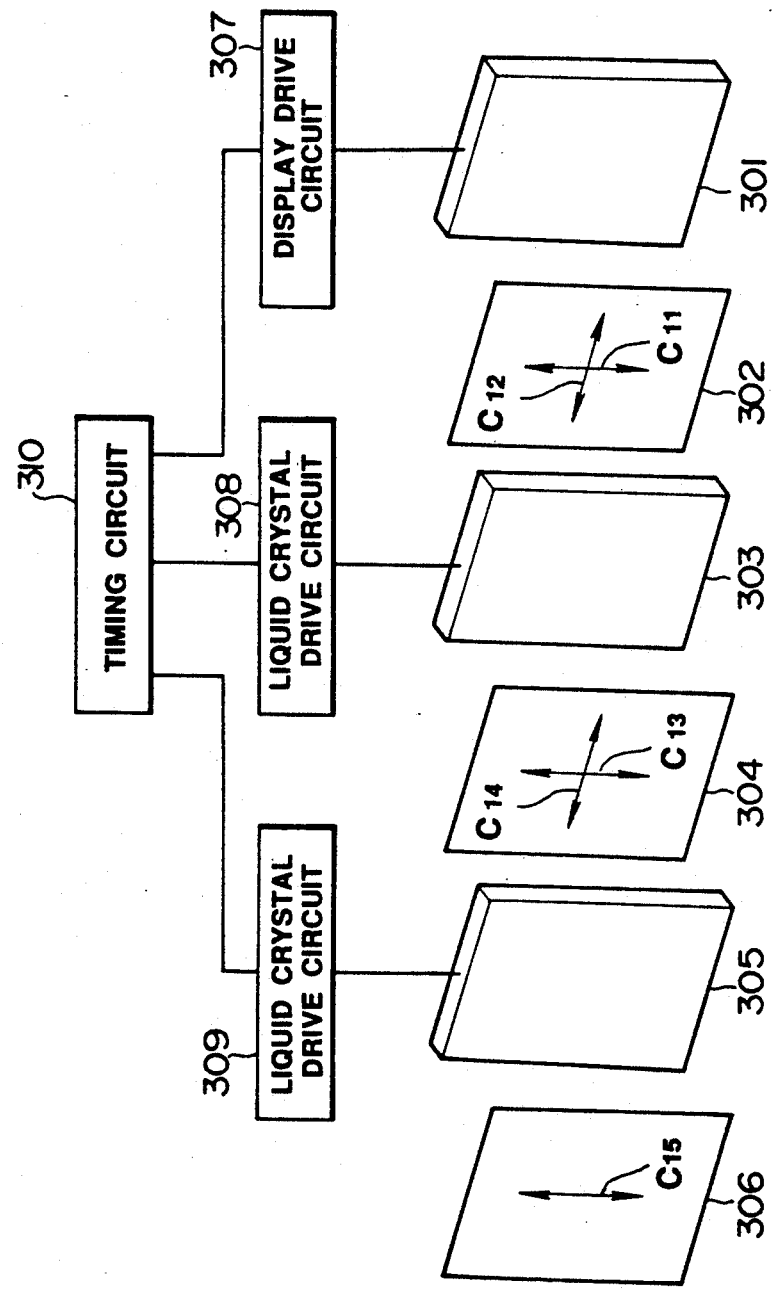
FIG. 7 is an exploded perspective view schematically showing a second embodiment of a color display device according to the present invention.

FIG. 7 is an exploded perspective view schematically showing a general structure of a second embodiment of a color display device according to the present invention.

A device of the second embodiment likewise includes a fluorescent display section 301 driven and controlled through a display drive circuit 307 and serving as a luminous section, which may be constructed in substantially the same manner as the fluorescent display section 1101 in the first embodiment described above.

The color display device also includes a twist-nematic liquid crystal cell (hereinafter referred to as "TN liquid crystal cell") 303 and a TN liquid crystal cell 305 arranged in front of the fluorescent display section 301. The TN liquid crystal cell 303 serves as a first optical rotation section driven and controlled by a first liquid crystal drive circuit 308 and the TN liquid crystal cell 305 serves as a second optical rotation section driven and controlled by a second liquid crystal drive circuit 309. The drive circuits 308 and 309 are connected to a timing circuit 310 to drive and control optical rotation characteristics of each of the first and second TN liquid crystal cells 303 and 305 in synchronism with driving and controlling of the fluorescent display section 301 for emission.

Between the fluorescent display section 301 and the first TN liquid crystal cell 303 is arranged a first color polarizing plate 302 which has a polarization axis $C_1$ defined on a vertical plane and adapted to transmit white light and a polarization axis $C_{12}$ defined on a horizontal plane and adapted to transmit blue color. Likewise, between the first TN liquid crystal cell 303 and the second TN liquid crystal cell 305 is provided a second color polarizing plate 304 which has a polarization axis $C_{13}$ defined on a vertical plane and adapted to transmit green light and a polarization axis $C_{14}$ defined on a horizontal plane and adapted to transmit white color. Also, a neutral polarizing plate 306 which has a polarization axis $C_{15}$ defined on a vertical plane and adapted to transmit white light is provided in front of the second color polarizing plate 304.

Now, the manner of operation of the second embodiment will be described hereinafter.

Figure 8:
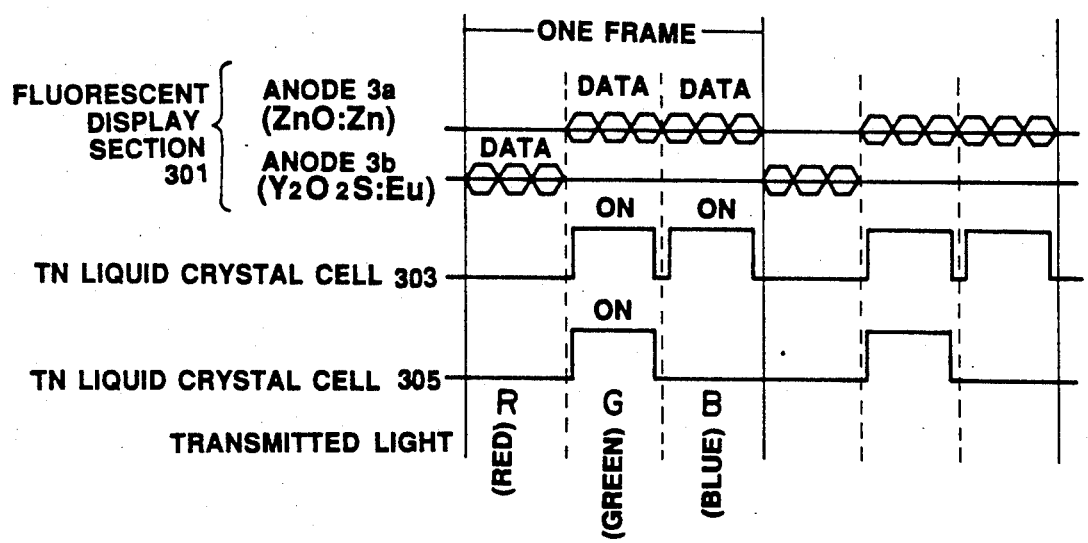
FIG. 8 is a timing chart showing a timing of drive of the color display device shown in FIG. 7.

FIG. 8 is a timing chart showing a timing of drive of the color display device of the second embodiment.

In the device of the second embodiment, as shown in FIG. 8, each one frame of the drive timing charge is divided into three fields or a red field R, a green field G and a blue field B, so that the fluorescent display section 301, first TN liquid crystal cell 303 and second TN liquid crystal cell 305 may be synchronously driven through a timing circuit 310.

More particularly, first, in the field R, a data for display is supplied to the fluorescent display section 301 to drive a $Y_2O_2S$:Eu phosphor 204 for emission and, in synchronism with the driving, both first and second TN liquid crystal cells 303 and 305 are turned off.

Accordingly, red light emitted from the fluorescent display section 301 consists of randomly polarized light components. However, it is passed through the first color polarizing plate 302 to lead to red light on the vertical plane and subjected to optical rotation by 90° to lead to red light on the horizontal plane. Thereafter, the lights are passed through the second color polarizing plate 304 and then guided to the second TN liquid crystal cell 305, in which they are subjected to optical rotation by 90° again to lead to red light on the vertical plane. Then, it is discharged from the neutral polarizing plate 306.

In the green field G, a display data is supplied to the fluorescent display section 301 to cause a ZnO:Zn phosphor 203 to emit light of a band-like spectrum and synchronously both first and second TN liquid crystal cells 303 and 305 are turned on.

Accordingly, light of a band-like spectrum emitted from the fluorescent display section 301 consists of randomly polarized light components in a specific wavelength range. However, it is passed through the first color polarizing plate 302 to lead to white light on the vertical plane and blue light on the horizontal plane. Then, after the lights are passed through the first TN liquid crystal cell 303 without being subjected to optical rotation, they are passed through the second color polarizing plate 304 to lead to green light on the vertical plane and blue light on the horizontal plane. Subsequently, the lights are passed through the second TN crystal liquid cell 305 without any optical rotation and guided to the neutral polarizing plate 306, which causes only green light on the vertical plane to be discharged therefrom.

Further, in the blue field B, a display data is likewise supplied to the fluorescent display section 301 to cause the ZnO:Zn phosphor 203 to emit light of a band-like spectrum and, in synchronism with the emission, the first TN liquid crystal cell 303 is turned on and the TN second liquid crystal cell 305 is turned off.

Accordingly, light of a band-like spectrum emitted from the fluorescent display section 301 is passed through the first color polarizing plate 302 to lead to white light on the vertical plane and blue light on the horizontal plane. Also, after the lights are passed through the first TN liquid crystal cell 303 without any optical rotation, they are passed through the second color polarizing plate 304 to lead to green light on the vertical plane and blue light on the horizontal plane. Thereafter, the lights are passed through the second TN crystal liquid cell 305, in which the lights are subjected to optical rotation by 90°, and then guided to the neutral polarizing plate 306, which causes only blue light on the vertical plane to be discharged therefrom.

As described above, the color display device of the second embodiment is so constructed that display of green and blue luminous colors is accomplished by time-sharing emission from the ZnO:Zn phosphor 203 and display characteristics of a red luminous color which the ZnO:Zn phosphor 203 lacks are obtained by the ZnO:Zn phosphor 203. Thus, it will be noted that the embodiment is adapted to combine time-sharing color mixture with parallel color mixture to carry out emission of light each of the colors red, green and blue, as well as equalize luminance of the emission to realize full color display of high quality which is free of unevenness.

In the first embodiment described above, a ferroelectric liquid crystal cell is used for the liquid crystal cell 103, whereas a twist-nematic liquid crystal cell is used for the liquid crystal cells 303 and 305. However, any other suitable liquid crystal cell such as a super twist-nematic liquid crystal, a liquid crystal of a two-cycle drive system, a π-cell as disclosed in Japanese patent application Laying-Open Publication No. 219720/1984, or the like may be used for the liquid crystal cells. Likewise, a crystalline birefrigence material such as PLZT may be likewise used for this purpose.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A color display device comprising:
a fluorescent display section including luminous sections having first luminous sections made up of a low velocity electron excited phosphor emitting light of plural wavelengths the plural wavelengths including a first primary green color and a second primary blue color having a luminous at a predetermined level or more in a specific wavelength range and second and separate luminous sections made up of a low velocity electron excited phosphor for emitting a third primary red color, said first and second luminous sections being arranged alternately;

at least one optical rotation section for transmitting light emitted from said fluorescent display section;

a neutral polarizing plate and a plurality of color polarizing plates arranged in a manner to interpose said optical rotation section therebetween;

a display drive section for selectively driving said first and second luminous sections depending on a display signal; and a control section for controlling optical rotation characteristics of said optical rotation section in synchronism with said display signal of said display drive section.

2. A color display device as defined in claim 1, wherein said fluorescent display section, said neutral polarizing plate, said optical rotation section, a first color polarizing plate for transmitting light of the first and third colors and a second color polarizing plate for transmitting light of the second and third colors are all arranged in parallel to each other.

3. A color display device as defined in claim 1, wherein said fluorescent display section, a first color polarizing plate, a first optical rotation section, a second color polarizing plate, a second optical rotation section and said neutral polarizing plate are all arranged in parallel to each other.

4. A color display device as defined in any one of claims 1 to 3, wherein said first and second luminous sections of said fluorescent display section are formed of a ZnO:Zn phosphor and a $Y_2O_2S$:Eu phosphor, respectively.

5. A color display device as defined in any one of claims 1 to 3, wherein said first and second luminous sections of said fluorescent display section are formed of a ZnO:Zn phosphor and a (Zn,Cd)S:Ag,Cl phosphor, respectively.

6. A color display device as defined in any one of claims 1 to 3, wherein said optical rotation section is formed of a liquid crystal cell.

* * * * *